Patented Aug. 6, 1940

2,210,268

UNITED STATES PATENT OFFICE 2,210,268

PROCESS FOR THE CONVERSION OF CHLORINE DIOXIDE INTO A SOLID FORM

Yüan-Chi Tang, Natung, China

No Drawing. Application November 27, 1937, Serial No. 176,918. In Germany September 17, 1937

6 Claims. (Cl. 260—290)

This invention relates to the treatment of chlorine dioxide and more particularly to a process for converting chlorine dioxide into a solid form.

Chlorine dioxide has long been recognized as a strongly effective oxidizing agent but its use therefor has been greatly restricted because of its highly explosive nature and consequent handling difficulties.

The object of the present invention is generally to convert chlorine dioxide into such a form that it may be safely and satisfactorily employed as an oxidizing and bleaching agent and whereby the extent of its use in industry may be increased in a manner that has not been possible heretofore. Specifically, the purpose of the invention is to provide a method for producing a solid compound which is adapted to evolve chlorine dioxide under the influence of heat or diminished pressure or in suitable solvents in the presence of substances capable of oxidation or chlorination.

According to the invention, the solid compound referred to is prepared by mixing a solution of chlorine dioxide with pyridine or its homologues or other suitable compounds of nitrogen, or solutions of the same, separating the reaction product from the solution, purifying the product by treatment with water, and evaporating the water from the product. The solvents employed for the pyridine or the like should be of a neutral nature and may be, for instance, carbon tetrachloride or water. The solid compound may also be prepared by passing chlorine dioxide into liquid pyridine or its homologues or other suitable compounds of nitrogen. In the latter case, care must be exercised and the pyridine or like compound should be well cooled before proceeding.

A method of preparing the compound according to the invention may be illustrated by the following example:

The chlorine dioxide may be prepared in an apparatus such as is disclosed in "Cellulosechemie" XVII, 23 (1936), with the modification that the second washing bottle as shown therein is filled with concentrated sulfuric acid instead of water. The chlorine dioxide is collected by passing it successively through two absorption vessels, the first of which contains 350 c. c. and the second 300 c. c. of carbon tetrachloride. The first solution usually becomes saturated after chlorine dioxide has been passed through it for about 6 hours, when it shows a red-brown coloring. The second solution at this stage is somewhat clearer than the first. Both solutions are now transferred to brown bottles and 100 c. c. of pure pyridine added to each one, drop by drop, under cooling conditions. The bottles containing each mixture are then allowed to stand for approximately 42 to 44 hours in a well-cooled container such as a refrigerator. At the end of this time, solid crusts have been formed on the mixture beginning from the walls of the bottles towards the middle. These crusts, under certain circumstances, may appear as black. A small quantity of tiny crystals is also formed.

The resulting product is now filtered, using a glass suction filter, and washed with carbon tetrachloride. The filtrate, it is noted, still contains unchanged pyridine.

The residue is treated with a large quantity of water until the filtrate runs nearly colorless. The dark filtrate obtained is now boiled several times with animal charcoal and filtered. The deep yellow filtrate obtained is then evaporated in a vacuum at a temperature not exceeding 45° C. When most of the water is evaporated, crystallization begins and, at the same time, gases having a characteristic chlorine dioxide odor are developed.

The evaporation process is now discontinued and the residue dried in a vacuum desiccator over phosphorus pentoxide and caustic soda. The solid product thus obtained corresponds with the formula $C_5H_5N \cdot ClO_2$, the first dark solution yielding 27 gms. and the second clearer solution yielding 14 gms. The filtered residue, after washing with water, consists of organic compounds of high melting point, which are probably formed by chlorination or by other reactions of pyridine.

The solid product is stable at ordinary temperatures. It is very hygroscopic in air, is readily soluble in water and evolves chlorine dioxide freely on heating or under diminished pressure. The decomposition by heating begins at about 100° C.

The compound produced in the manner described is suitable for all commercial uses to which chlorine dioxide may be applied and wherein the pyridine or its equivalent has no disturbing effect. As previously pointed out, however, the handling difficulties incident to the use of chlorine dioxide are absent when such a compound is employed.

The compound may, for instance, be employed in an aqueous solution, for freeing cellulose from incrustations, as in the preparation of bast fibres. It may also be used for the bleaching of cotton, pulp and animal fibres and tissues. In the treatment of substances capable of oxidation and chlorination the compound is employed in a solvent, the solution being placed in contact with the substances under treatment, when decomposition of the compound occurs. In addition to water, any suitable neutral solvent for the compound may be selected in accordance with the purpose to which it is to be applied. For instance, under some circumstances, glacial acetic acid may be employed.

I claim:

1. In the production of solid reaction products of chlorine dioxide the method which comprises reacting chlorine dioxide with a member of the class consisting of pyridine and its homologues in a neutral solvent under cooling conditions, separating the reaction product, washing with water and evaporating the aqueous solution to recover more product.

2. In the production of solid reaction products of chlorine dioxide the method which comprises reacting chlorine dioxide with a member of the class consisting of pyridine and its homologues in carbon tetrachloride under cooling conditions, separating the reaction product, purifying the product by treatment with water, and evaporating the aqueous solution formed in a vacuum at a temperature not exceeding 45° C.

3. A method of the character described which comprises reacting chlorine dioxide with a member of the class consisting of pyridine and its homologues in the presence of a neutral solvent under cooling conditions, and separating the reaction product.

4. A method as set forth in claim 3 wherein the solvent is carbon tetrachloride and the reaction product is purified with water and dried in vacuum.

5. A method of the character described which comprises saturating a neutral solvent with chlorine dioxide, adding to the solution a member of the class consisting of pyridine and its homologues under cooling conditions, removing the reaction product, washing the product with water, treating the wash water with charcoal, and evaporating the water under vacuum to recover more product.

6. A method of the character described which comprises saturating a neutral solvent with chlorine dioxide, adding to the solution under cooling conditions tertiary nitrogen bases containing a pyridine ring, separating the reaction product, washing the product with water and evaporating the aqueous solution in vacuum at a temperature not exceeding 45° C. to recover more of the reaction product.

YÜAN-CHI TANG.